June 8, 1926.
H. G. JORGENSEN
TEETHING RING
Filed April 25, 1923
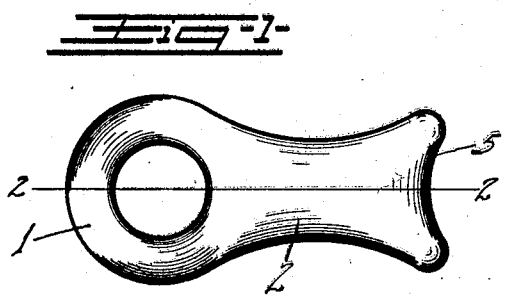
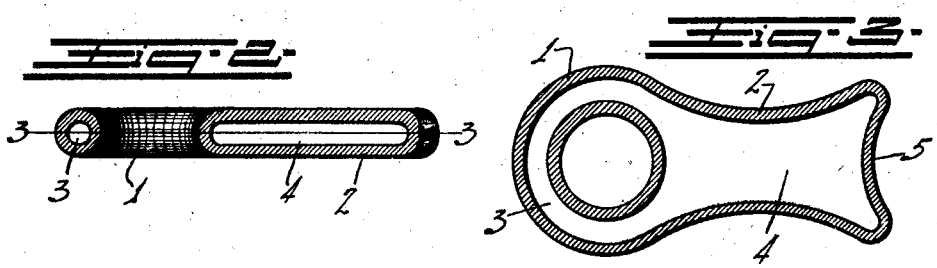
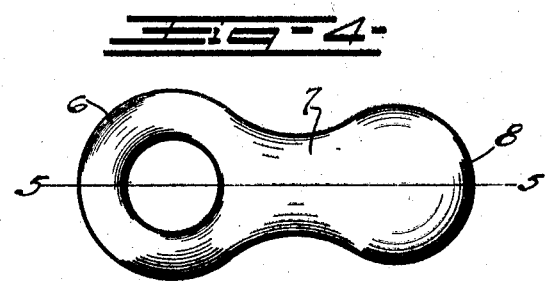
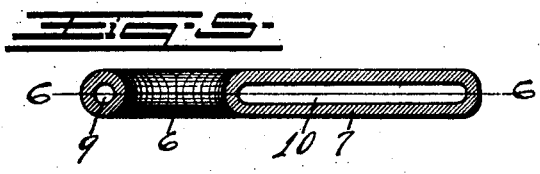
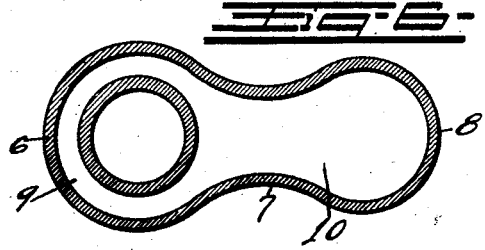
Inventor
Hans G. Jorgensen
Attorney Patented June 8, 1926.

1,587,960

UNITED STATES PATENT OFFICE.

HANS G. JORGENSEN, OF ERIE, PENNSYLVANIA.

TEETHING RING.

Application filed April 25, 1923. Serial No. 634,497.

Teething rings as ordinarily made do not adapt themselves as well to the gums as is desirable and the present invention is designed to improve devices of this character in this respect.

The invention is illustrated in the accompanying drawings as follows:—

Fig. 1 shows a plan view of a ring.
Fig. 2 a section on the line 2—2 in Fig. 1.
Fig. 3 a section on the line 3—3 in Fig. 2.
Fig. 4 a plan view of an alternative construction.
Fig. 5 a section on the line 5—5 in Fig. 4.
Fig. 6 a section on the line 6—6 in Fig. 5.

1 marks the ring and 2 an extension on the ring. These parts are formed integrally of soft rubber. The ring is formed hollow with a cavity 3 and this cavity merges in a cavity 4 in the extension. In the preferred form of extension the end 5 of the extension is concave so as to more readily follow the conformation of the gums and the intermediate portion of the extension is narrower than the end of the extension so that this also assists in its adaptability to the gums.

By forming the cavity in the ring the edge walls form a comparatively stiff portion within which the parts are very much softer, the cavity permitting the collapsing of the walls and this permits the engaged walls to conform more certainly to the conformation of the gums, and thus massages them more effectively than the solid rings.

In the alternative construction shown in Figs. 4, 5 and 6 the ring 6 has an extension 7, and a convex end 8. The ring has a cavity 9. This merges in a cavity 10 in the extension.

What I claim as new is:—

A teething device formed of soft rubber, comprising a hollow annular portion, and a hollow flat extension integral with, and merging into said annular portion.

In testimony whereof I have hereunto set my hand.

HANS G. JORGENSEN.